(12) United States Patent
Chinavare et al.

(10) Patent No.: US 8,201,894 B2
(45) Date of Patent: Jun. 19, 2012

(54) VEHICLE WHEEL TRIM INSERT ASSEMBLY

(75) Inventors: Kevin M. Chinavare, Middleville, MI (US); Harvey D. Hammond, Grand Haven, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 251 days.

(21) Appl. No.: 12/611,597

(22) Filed: Nov. 3, 2009

(65) Prior Publication Data

US 2011/0101766 A1 May 5, 2011

(51) Int. Cl.
*B60B 7/04* (2006.01)
(52) U.S. Cl. .............. 301/37.28; 301/37.106; 301/37.31
(58) Field of Classification Search ............. 301/37.101, 301/37.28, 37.102, 37.106, 37.108, 37.109
See application file for complete search history.

(56) References Cited

U.S. PATENT DOCUMENTS

| 6,439,670 | B1 * | 8/2002 | Winters | 301/37.101 |
| 6,517,168 | B1 * | 2/2003 | Van Houten | 301/37.42 |
| 6,669,305 | B2 * | 12/2003 | Ichikawa | 301/37.28 |
| 7,246,860 | B1 * | 7/2007 | Seitz | 301/37.28 |
| 2004/0195905 | A1 * | 10/2004 | French et al. | 301/37.28 |

* cited by examiner

*Primary Examiner* — Jason Bellinger
(74) *Attorney, Agent, or Firm* — Price Heneveld LLP

(57) ABSTRACT

A vehicle wheel assembly includes a vehicle wheel having an outer surface, and a wheel cladding having an outer surface, an inner surface facing the outer surface of the wheel, and at least one aperture extending between the outer surface and the inner surface. The vehicle wheel assembly further includes a trim insert assembly that includes a first member that abuts the outer surface of the wheel cladding substantially proximate the at least one aperture of the wheel cladding, and at least one first portion of a coupler, and a second member including an outer surface having an aesthetic outer appearance, and at least one second portion of a coupler, wherein the first portion of the coupler and the second portion of the coupler are coupled with one another, thereby securing the trim insert within the aperture of the wheel cladding.

15 Claims, 5 Drawing Sheets

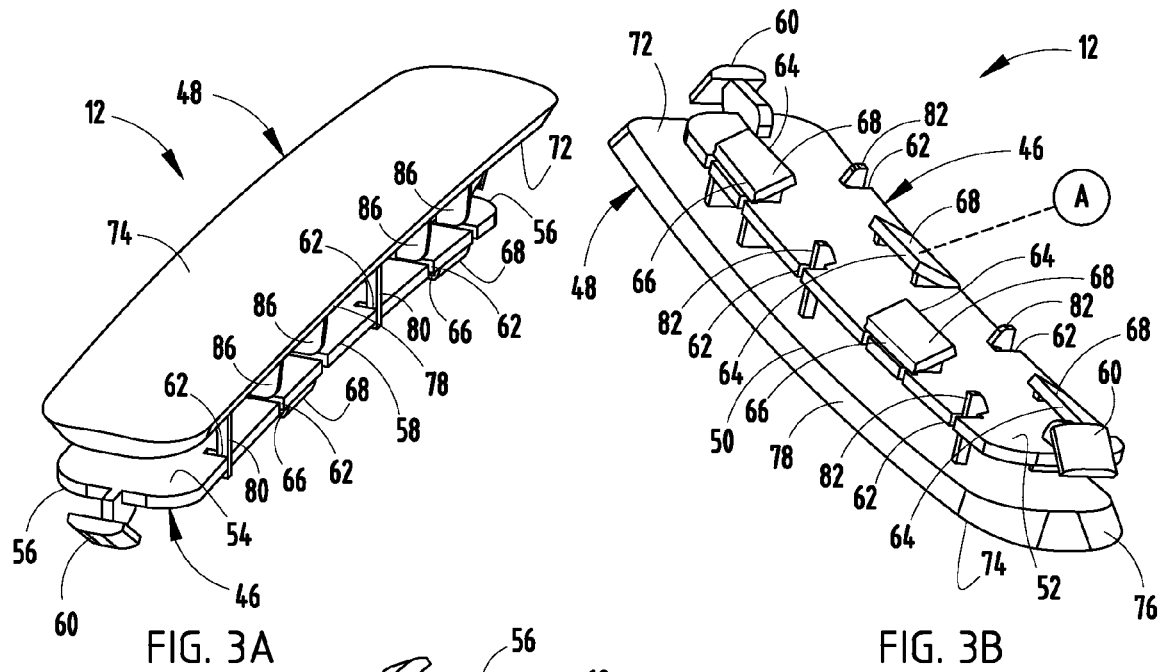
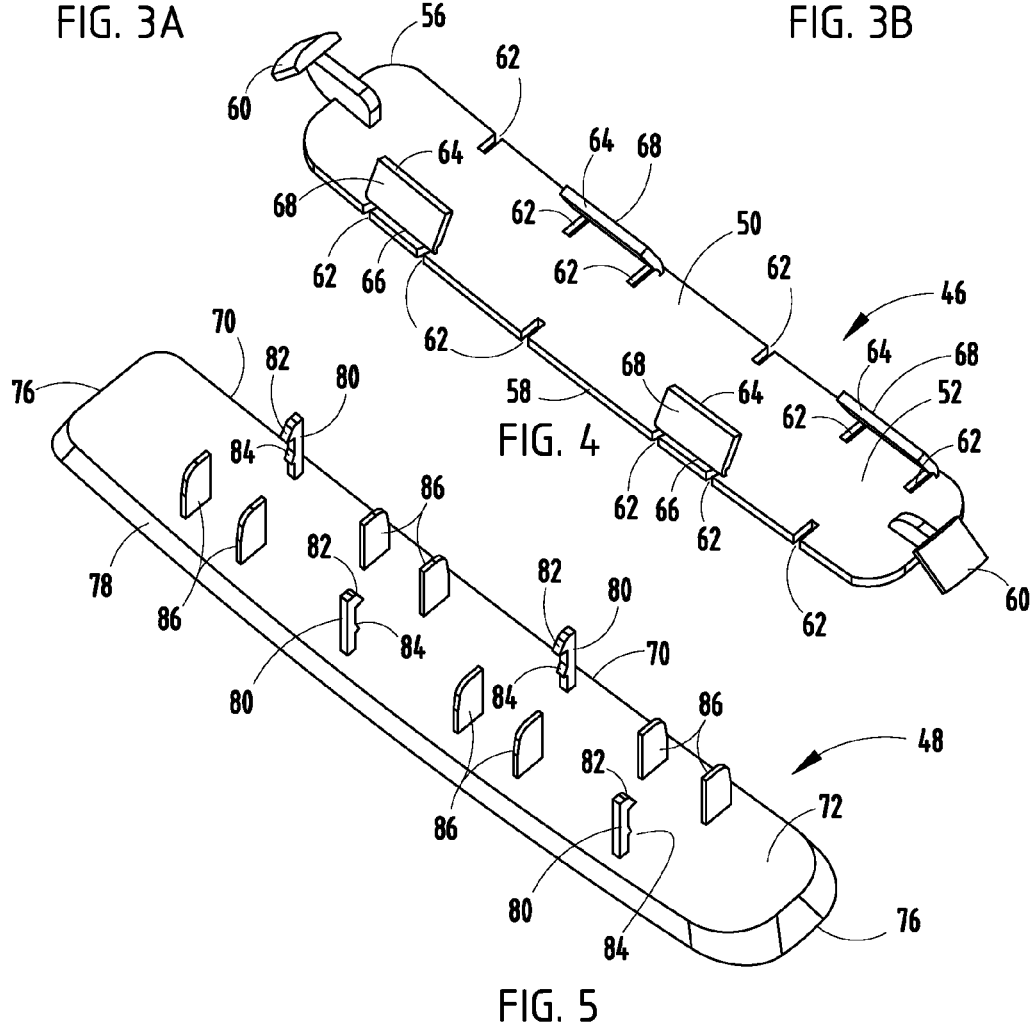

VEHICLE WHEEL TRIM INSERT ASSEMBLY

BACKGROUND OF THE INVENTION

The present invention relates to a wheel trim insert assembly, and in particular, a wheel trim insert assembly within a wheel and a wheel cladding assembly.

SUMMARY OF THE INVENTION

One aspect of the present invention is to provide a vehicle wheel assembly that comprises a vehicle wheel having an outer surface, and a wheel cladding having an outer surface, an inner surface facing the outer surface of the wheel, and at least one aperture extending between the outer surface of the wheel cladding and the inner surface of the wheel cladding. The vehicle wheel assembly further comprises a trim insert assembly that includes a first member that abuts the outer surface of the wheel cladding substantially proximate the at least one aperture of the wheel, and at least one first portion of a coupler, and a second member that includes an outer surface having an aesthetic outer appearance, and at least one second portion of a coupler, wherein the first portion of the coupler and the second portion of the coupler are coupled with one another, thereby securing the trim insert within the aperture of the wheel of the cladding.

Another aspect of the present invention is to provide a vehicle wheel trim insert assembly for a wheel cladding having an outer surface, an inner surface, and at least one aperture extending through the outer surface, the trim insert assembly comprising a first member adapted to abut an outer surface of a wheel cladding substantially proximate at least one aperture of a wheel cladding, and including at least one first portion of a coupler, and a second member including an outer surface having an aesthetic outer appearance, and at least one second portion of a coupler, wherein the first portion of the coupler and the second portion of the coupler are adapted to couple with one another, thereby securing the trim insert within an aperture of a wheel and an aperture of a cladding. The first member includes at least one actuator tab, while the second member includes at least one securing member movable between a first position, wherein the at least one securing member is spaced from a wheel cladding, and a second position, wherein the at least one securing member is adapted to affix to a wheel cladding, and wherein the at least one actuator tab abuts the at least one securing member and moves the at least one securing member from the first position to the second position as the first member and the second member are coupled to one another.

The present invention is durable, includes an uncomplicated design, and may be easily and quickly assembled by even unskilled personnel without the use of any specialized tools. The present invention is economical to manufacture, capable of a long operating life, and is particularly well adapted for the proposed use of providing a unique aesthetic appearance to wheel assemblies that include both a wheel and wheel cladding attached thereto.

These and advantages of the invention will be further understood and appreciated by those skilled in the art by reference to the following written specification, claims and appended drawings.

BRIEF DESCRIPTION OF THE DRAWINGS

FIG. 3A is a perspective view of an outer surface, a side surface and an end surface of the wheel trim assembly, wherein a plurality of securing members are located in a first position;

FIG. 3B a perspective view of an inner surface, a side surface and an end surface of the wheel trim assembly, wherein a plurality of securing members are located in a first position;

FIG. 4 is a perspective view of an inner surface, a side surface and an end surface of a first member of the wheel trim assembly;

FIG. 5 is a perspective view of an inner surface, a side surface, and an end surface of a second member of the wheel trim assembly;

DETAILED DESCRIPTION OF THE PREFERRED EMBODIMENTS

Figure 1:
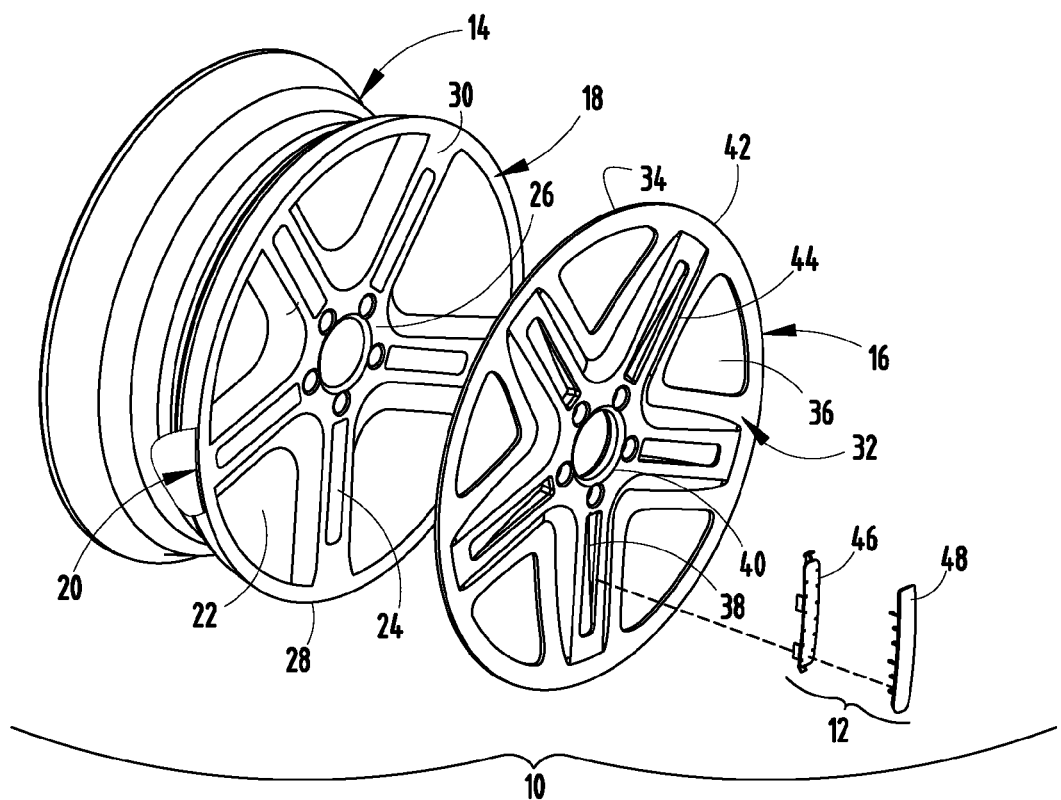
FIG. 1 is an exploded perspective view of a vehicle wheel assembly including a wheel trim assembly embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
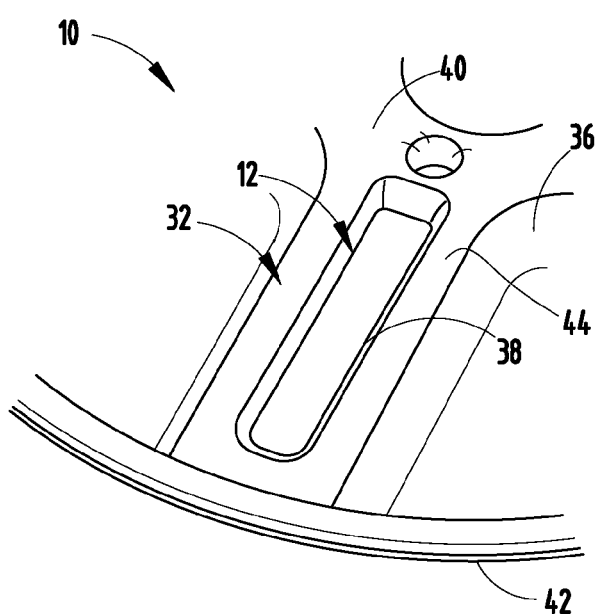
FIG. 2 is a partial perspective view of the wheel assembly, including the wheel trim assembly positioned within an associated wheel and wheel cladding.

The reference numeral 10 (FIGS. 1 and 2) generally designates a wheel assembly that includes a wheel trim insert assembly 12 embodying the present invention. In the illustrated example, the wheel assembly 10 includes a vehicle wheel 14, a wheel cladding 16, and the trim insert assembly 12.

The vehicle wheel 14 includes an outer surface 18, an inner surface 20, and a plurality of turbine openings 22 spaced circumferentially. The vehicle wheel 14 further includes a hub portion 26, a rim portion 28 extending circumferentially, and a plurality of apertures 24 interspaced circumferentially with the turbine openings 22 about the vehicle wheel 14, and a web portion 30 extending between the hub portion 26 and the rim portion 28. The hub portion 26, the rim portion 28 and the web portion 30 cooperate to form the outer surface 18 of the vehicle wheel 14.

The wheel cladding 16 includes a decorative outer surface 32, an inner surface 34, a plurality of turbine openings 36 spaced circumferentially around the cladding 16, and a plurality of apertures 38 interspaced with the turbine openings 36 and adapted to receive the trim insert assemblies 12 therein. In the illustrated example, the turbine openings 36 of the wheel cladding 16 are similarly shaped and are substantially aligned with the turbine openings 22 of the wheel 14. The wheel cladding 16 further includes a hub portion 40, a rim portion 42 extending circumferentially about the wheel cladding 16, and a web portion 44 extending between the hub portion 40 and the rim portion 42, wherein the hub portion 40, the rim portion 42 and the web portion 44 cooperate to form the outer surface 32. The wheel cover 16 can, of course, comprise numerous materials, including formed aluminum, steel, stainless steel, and combinations thereof, such as metal coated polymeric claddings, such as those exemplified in U.S. Pat. Nos. 5,564,791; 5,577,809; 5,597,213; 5,630,654; 5,636,903; 5,845,973; and 6,085,829, which are incorporated herein by reference in their entirety. In assembly, the wheel cladding 16 is secured to the vehicle wheel 14 such that the inner surface 34 of the wheel cladding 16 faces and is proximate the outer surface 18 of the vehicle wheel 14. In the illustrated example, the wheel cladding 16 is secured to the vehicle wheel 14 via an adhesive, however, any known method for securing the wheel cladding 16 to the vehicle wheel 14 may be utilized, including, but not limited to, contact adhesives, foaming adhesives, mechanical fasteners, and the like. The hub portion 40, the rim portion 42 and the web portion 44 of the wheel cladding 16 are substantially aligned with and cover the corresponding hub portion 26, the rim portion 28 and the web portion 30 of the vehicle wheel 14 when the wheel cladding 16 is secured to the vehicle wheel 14, such that the turbine openings 36 of the wheel cladding 16 are aligned with the corresponding turbine openings 22 of the vehicle wheel 14.

The wheel trim insert assembly 12 (FIGS. 3A and 3B) includes an inner member 46 coupled with an outer member 48. The inner member 46 (FIG. 4) includes an elongated body portion 50 having an inner surface 52, and outer surface 54, opposite ends 56, and a peripheral edge 58. The inner member 46 further includes a pair of position locator tabs 60 extending from the opposite ends 56 thereof, and configured so as to abut the outer surface 32 of the wheel cladding 16, thereby aligning the inner member 46 with the wheel cladding 16 during assembly. The inner member 46 further includes a plurality of notches 62 spaced about the peripheral edge 58, and adapted to receive corresponding tabs therein, as described below. The inner member 46 further includes a plurality of securing tabs 64 spaced about the periphery of the inner member 46 and each secured to the peripheral edge 58 of the body portion 50 via a living hinge 66. Each securing tab 64 includes an abutment surface 68 coated with an adhesive, and adapted to abut the inner surface 20 of the vehicle wheel 14, thereby securing the trim insert assembly 12 to the vehicle wheel 14, as described below.

The outer member 48 (FIG. 5) of the trim insert assembly 12 includes an elongated body portion 70, an inner surface 72, an outer surface 74, a pair of opposite ends 76, and beveled peripheral edge 78 extending thereabout. The outer surface 74 may include a finish or aesthetic appearance similar to that as described above with respect to the wheel cladding 16, or may include an alternative covering, thereby highlighting the aesthetic appearance and differences of the overall wheel assembly 10. A plurality of engagement hooks or tabs 80 extend inwardly from the inner surface 72 each including a hook-shaped end 82, and a detent 84 located along the length of the tab 80. A plurality of actuator tabs 86 extend from the inner surface 72 of the body portion 70 and are inner spaced with the engagement hooks 80.

Figure 6A:
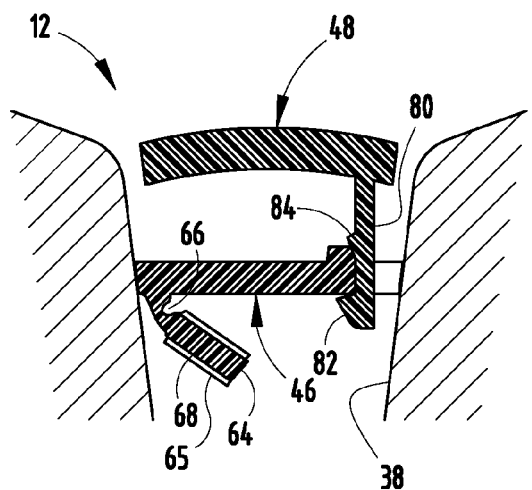
FIG. 6A is a cross-sectional view of the wheel trim assembly with the first member partially engaged with the second member.
Figure 6B:
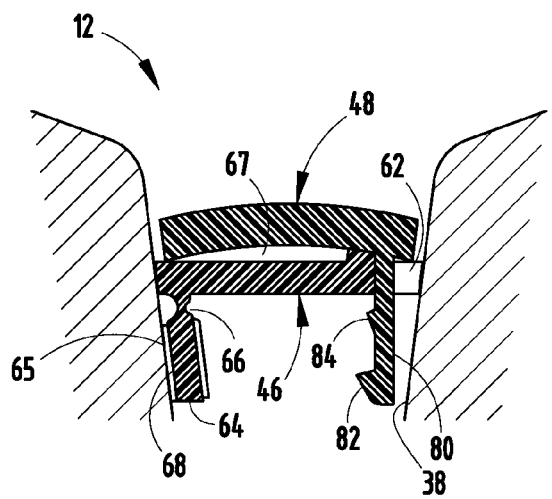
FIG. 6B is a cross-sectional view of the wheel trim assembly with the first member completely engaged with the second member.
Figure 7A:
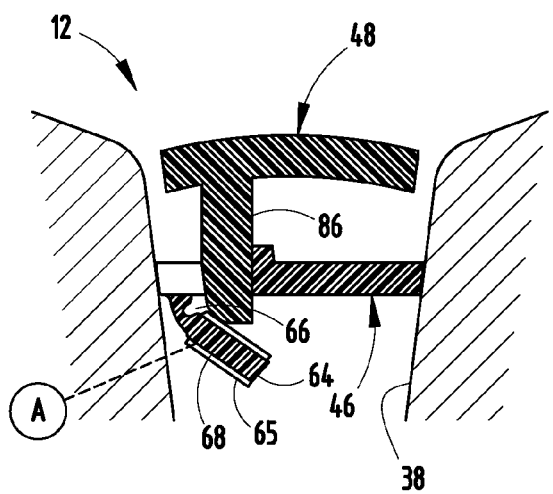
FIG. 7A is a cross-sectional end view of the wheel trim assembly with the plurality of securing members shown in the first position.
Figure 7B:
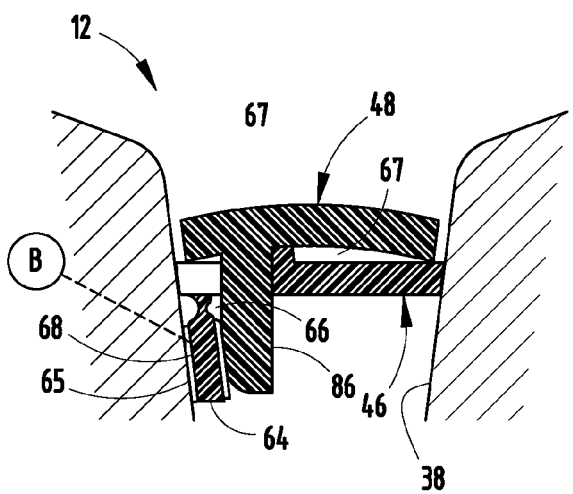
FIG. 7B is a cross-sectional end view of the wheel trim assembly with the plurality of securing members shown in a second position.
Figure 8A:
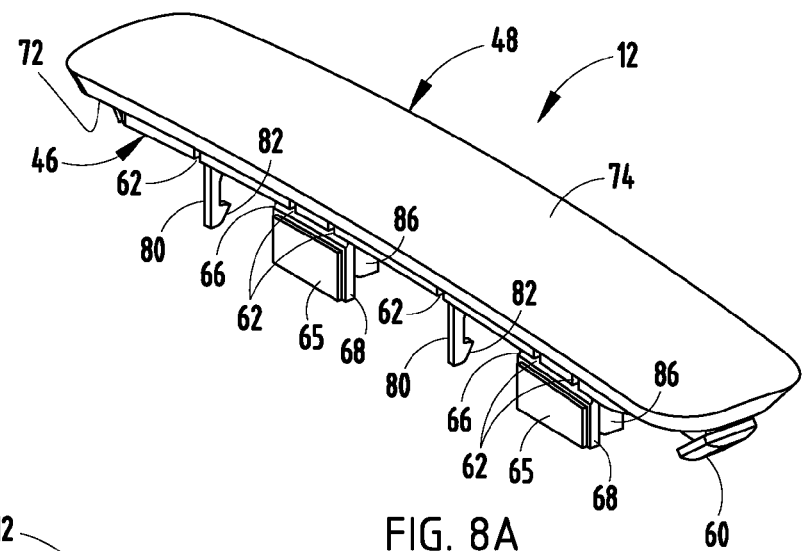
FIG. 8A is a perspective view of an outer surface, a side surface and an end surface of the wheel trim assembly, wherein a plurality of securing members are located in the second position.
Figure 8B:
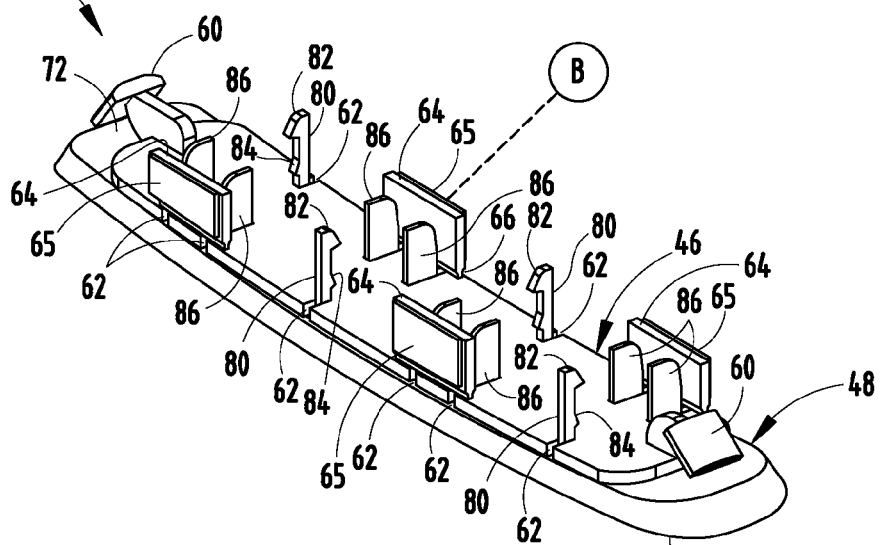
FIG. 8B a perspective view of an inner surface, a side surface and an end surface of the wheel trim assembly, wherein a plurality of securing members are located in the second position.

In assembly, the wheel cladding 16 is secured to the vehicle wheel 14 in a manner described above. With respect to securing the wheel trim insert assembly 12 to the wheel cladding 16, the inner member 46 is aligned with one of the apertures 38 of the wheel cladding 16, such that the position locator tabs 60 abut the outer surface 32 of wheel cladding 16 proximate the aperture 38. The inner member 46 and the outer member 48 are then coupled with one another by aligning the outer member 48 with the inner member 46, and specifically by aligning the engagement hooks 80 and the actuator tabs 86 of the outer member 48 with the notches 62 of the inner member 40. As the engagement tabs 80 (FIG. 6A) extend into the corresponding notches 62, the hook-shaped end 82 of each hook engages the inner member 46 and at least temporarily couples the outer member 48 with the inner member 46. At the same time, the actuator tabs 86 (FIG. 7A) extend through corresponding notches 62 such that the actuator tabs 86 abut the securing tabs 64, while the securing tabs 64 are in the first position A. As the inner member 46 and the outer member 48 are pressed closer to one another, each of the engagement hooks 80 (FIG. 6B) extends deeper into the notches 62 until the detent 84 of each engagement hook 80 abuts the inner member 46. At the same time, the actuator tabs 86 (FIG. 7B) extend deeper into the corresponding notches 62, and actuate the corresponding securing tab 64 from the first position A, to an engaged position B, wherein securing tab 64 abuts the wheel cladding 16, such that adhesive 65 can secure the trim insert assembly 12 to the wheel cladding 16. Alternatively, an adhesive may be placed into a gap 67 between the inner member 46 and the outer member 48. In another alternative embodiment, the wheel trim insert assembly 12 can be secured directly with the wheel 14 by securing the insert assembly 12 within one of the apertures 24 of the wheel 14 in a similar manner.

Figure 9A:
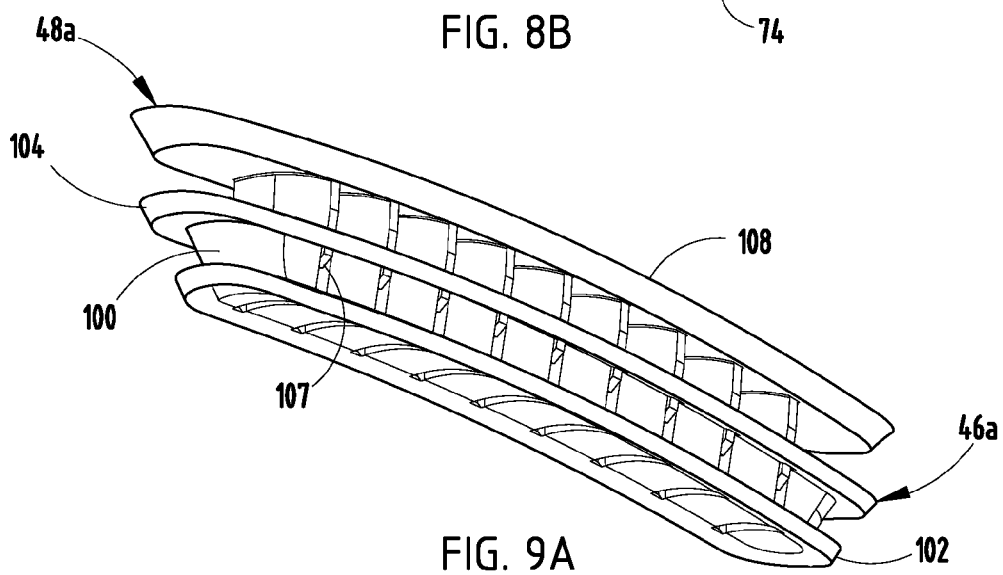
FIG. 9A is a perspective view of a first alternative embodiment of the wheel trim assembly.
Figure 9B:
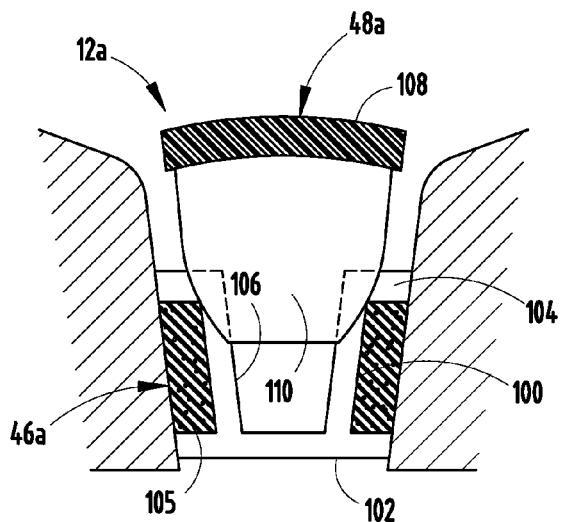
FIG. 9B is a cross-sectional end view of a first alternative embodiment of the wheel trim assembly with a first member in a partially engaged position.
Figure 9C:
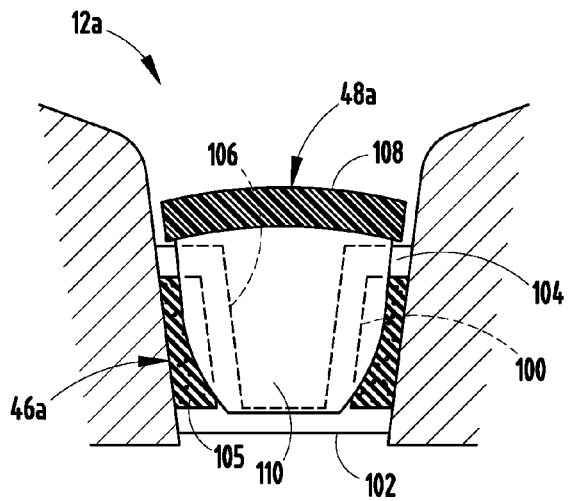
FIG. 9C is a cross-sectional end view of the first alternative embodiment of the wheel trim assembly with the first member in a completely engaged position.

The reference numeral 12a (FIGS. 9A-9C) generally designates another embodiment of the trim insert assembly. Since the trim insert assembly 12a is similar to the previously-described trim insert assembly 12, similar parts appearing in FIGS. 1-8B and FIGS. 9A-9C, respectively, are represented by the same, corresponding reference numeral, except for the suffix "a" in the numerals of the latter. In the trim insert assembly 12a, the inner member 46a includes a body portion 100 having outwardly-extending lower flanges 102 and outwardly-extending upper flanges 104 each adapted to abut the respective apertures 24, 38. The inner member 46a also includes an adhesive layer located between the lower and upper flanges 102, 104, and a centrally-located aperture 106. A plurality of tab-receiving slots 107 are circumferentially spaced about the inner member 46a. The outer member 48a includes a body portion 108 and a plurality of tabs 110 spaced longitudinally along the length of the body portion 108. In assembly, the tabs 110 are received into the slots 107, such that the tabs 110 press against the adhesive layer 105 forcing the adhesive layer 105 into contact with the wheel cladding 16.

Figure 10:
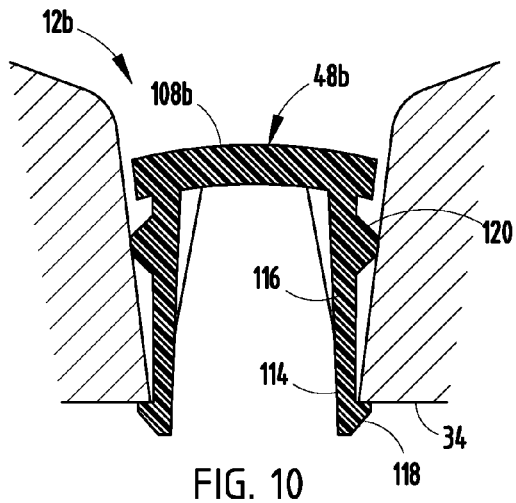
FIG. 10 is a cross-sectional end view of a second alternative embodiment of the wheel trim assembly.

The reference numeral 12b (FIG. 10) generally designates another embodiment of the trim insert assembly. Since the trim insert assembly 12b is similar to the trim insert assembly 12 previously described, similar parts appearing in FIGS. 1-8B and FIG. 10, respectively, are represented by the same, corresponding reference numeral, except for the suffix "b" in the numerals of the latter. In the trim insert assembly 12b, an outer member 48b includes a body portion 108b and a plurality of inwardly-extending tabs 114 based about the periphery of the body portion 108b. Each of the tabs 114 includes an arm 116 having a hook-shaped end 118 and an irregularity 120 spaced along the length thereof. In assembly, the outer member 48a is pressed inwardly into the apertures 38, 24 until the hook portion 118 engages the inner surface 34 of the wheel cladding 16, and the irregularities 120 abut the wheel cladding 116 proximate the apertures 38, thereby aligning and securing the outer member 48a within the associated wheel assembly 10.

Figure 11:
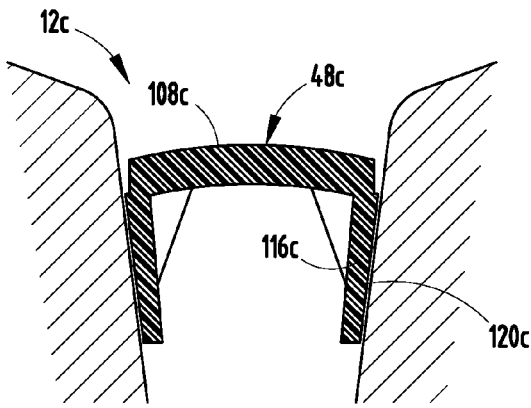
FIG. 11 is a cross-sectional end view of a third alternative embodiment of the wheel trim assembly.

The reference numeral 12c (FIG. 11) generally designates another embodiment of the wheel trim assembly. Since the wheel trim assembly 12c is similar to the previously-described wheel trim assembly 12b, similar parts appearing in FIG. 10 and in FIG. 11, respectively, are represented by the same, corresponding reference numeral, except for the suffix "c" in the numerals of the latter. In the wheel trim assembly 12c, a plurality of tabs 116c are spaced about the periphery of the body portion 108c. An adhesive layer 120c is located between each of the tabs 116c and the walls of the associated aperture 38, thereby securing the outer member 48c to the wheel assembly 10.

Figure 12:
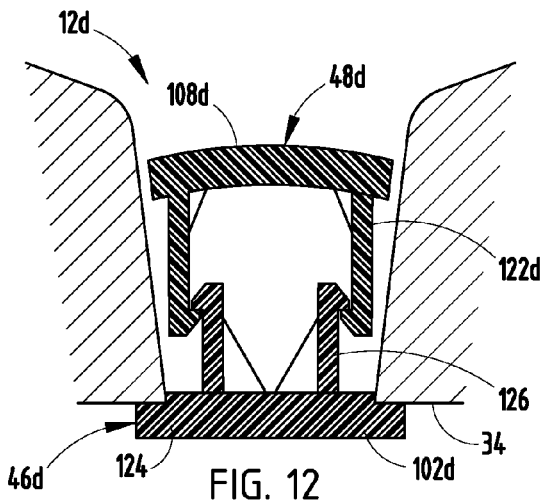
FIG. 12 a cross-sectional end view of a fourth alternative embodiment of the wheel trim assembly.

The 12d (FIG. 12) generally designates another embodiment of the wheel trim assembly. Since the wheel trim assembly 12d is similar to the previously-described wheel trim assembly 12, similar parts appearing in FIG. 12 and FIGS. 1-8B, respectively, are represented by the same, corresponding reference numeral except for the suffix "d" in the numerals of the latter. In the wheel trim assembly 12d, a plurality of hook members 122d extend inwardly from a body portion 108d of the outer member 48d, while a plurality of hook portions 126 extend outwardly from a body portion 124 of the inner member 46d. In assembly, the hook tabs 122d engage the hook tabs or hook portions 126, such that the body portion 124 of the inner member 46d abuts an inner surface 34 of the wheel cladding 16, and the outer member 48d is secured within the associated aperture 38.

Figure 13:
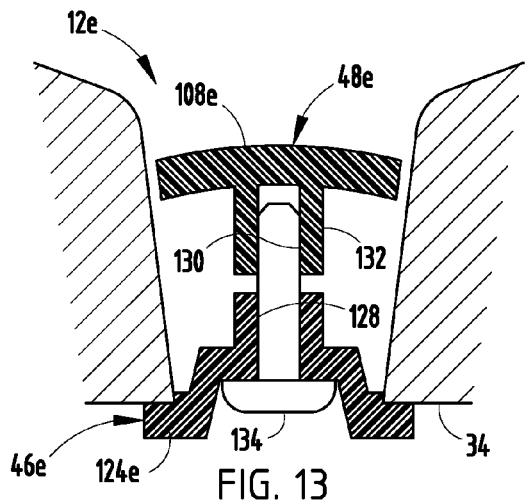
FIG. 13 is a cross-sectional end view of a fifth alternative embodiment of the wheel trim assembly.

The reference numeral 12e (FIG. 13) generally designates another embodiment of the wheel trim assembly. Since the wheel trim assembly 12e is similar to the previously-described wheel trim assembly 12, similar parts appearing in FIGS. 1-8A and FIG. 13, respectively, are represented by the same, corresponding reference numeral except for the suffix "e" in the numerals of the latter. The inner member 46e includes a body portion 124e that abuts the inner surface 20 of the wheel 14 in at least one aperture 128 extending therethrough. The outer member 48e includes a body portion 108e and at least one aperture 130 defined in a standup extending inwardly from the body portion 108e. In assembly, the inner member 46e is secured to the outer member 48e, and the outer member 48e is secured within the associated aperture 38 by a mechanical fastener 134, such as a screw, push pin, or other mechanical fastener, that is received through the aperture 128 and into the aperture 130.

The present invention is durable, includes an uncomplicated design, and may be easily and quickly assembled by even unskilled personnel without the use of any specialized tools. The present invention is economical to manufacture, capable of a long operating life, and is particularly well adapted for the proposed use of providing a unique aesthetic appearance to wheel assemblies that include both a wheel and wheel cladding attached thereto.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A vehicle wheel assembly, comprising:
   a vehicle wheel having an outer surface;
   a wheel cladding having an outer surface, an inner surface facing the outer surface of the wheel, and at least one aperture extending between the outer surface of the wheel cladding and the inner surface of the wheel cladding; and
   a trim insert assembly, comprising:
      a first member that abuts the outer surface of the wheel cladding, and including at least one first portion of a coupler; and
      a second member that includes an outer surface having an aesthetic outer appearance, and at least one second portion of a coupler, wherein the first portion of the coupler and the second portion of the coupler are coupled with one another, thereby securing the trim insert within the aperture of the wheel cladding; and
      wherein the first member includes at least one second tab, the second member includes at least one securing member movable between a first position, wherein the at least one securing member does not abut the wheel, and a second position, wherein the at least one securing member is affixed to the wheel, and wherein the at least one second tab abuts the at least one securing member and moves the at least one securing member from the first position to the second position as the first member and the second member are coupled to one another.

2. The vehicle wheel assembly of claim 1, wherein the second member includes at least one second notch that receives the at least one second tab therethrough.

3. The vehicle wheel assembly of claim 2, wherein the at least one second tab includes a plurality of second tabs spaced about a periphery of the first member, and wherein the at least one one securing member includes a plurality of securing members spaced about a periphery of the second member.

4. The vehicle wheel assembly of claim 1, wherein the at least one securing member includes an adhesive securing the at least one securing member to the wheel cladding.

5. The vehicle wheel assembly of claim 1, wherein the at least one securing member is hingedly coupled to the first member.

6. A vehicle wheel assembly, comprising:
   a vehicle wheel having an outer surface;
   a wheel cladding having an outer surface, an inner surface facing the outer surface of the wheel, and at least one aperture extending between the outer surface of the wheel cladding and the inner surface of the wheel cladding; and a trim insert assembly, comprising:
   a first member that abuts the outer surface of the wheel cladding, and including at least one first portion of a coupler; and
   a second member that includes an outer surface having an aesthetic outer appearance, and at least one second portion of a coupler, wherein the first portion of the coupler and the second portion of the coupler are coupled with one another, thereby securing the trim insert within the aperture of the wheel cladding; and wherein at least one alignment tab includes a pair of alignment tabs positioned across the first member from one another.

7. A vehicle wheel trim insert assembly for a wheel cladding having an outer surface, an inner surface, and at least one aperture extending through the outer surface, the wheel trim insert assembly comprising:
   a first member adapted to abut an outer surface of a wheel cladding substantially proximate at least one aperture of a wheel cladding, and including at least one first portion of a coupler; and
   a second member including an outer surface having an aesthetic outer appearance, and at least one second portion of a coupler, wherein the first coupler portion and the second coupler portion are adapted to couple with one another, thereby securing the trim insert within an aperture of a wheel and an aperture of a cladding; and
   wherein the first member includes at least one actuator tab, the second member includes at least one securing member movable between a first position, wherein the at least one securing member does not abut the wheel cladding, and a second position, wherein the at least one securing member is adapted to affix to the wheel cladding, and wherein the at least one actuator tab abuts the at least one securing member and moves the at least one securing member from the first position to the second position as the first member and the second member are coupled to one another.

8. The vehicle wheel trim insert assembly of claim 7, wherein the at least one first coupler portion includes at least one irregularity along a length thereof, and wherein the at least one second coupler portion includes a first notch adapted to engage the at least one irregularity, thereby coupling the at least one first coupler portion with the at least one second coupler portion.

9. The vehicle wheel trim insert assembly of claim 8, wherein the at least one first coupler portion includes a hook-shaped end.

10. The vehicle wheel trim insert assembly of claim 7, wherein the second member includes at least one second notch that receives the at least one actuator tab therethrough.

11. The vehicle wheel trim insert assembly of claim 10, wherein the at least one actuator tab includes a plurality of second actuator tabs spaced about a periphery of the first member, and wherein the at least one securing member includes a plurality of securing members spaced about a periphery of the second member.

12. The vehicle wheel trim insert assembly of claim 7, wherein the at least one securing member includes an adhesive adapted to secure the at least one securing member to the wheel cladding.

13. The vehicle wheel trim insert assembly of claim 7, wherein the at least one securing member is hingedly secured to the first member.

14. The vehicle wheel trim insert assembly of claim 7, wherein the first member includes at least one alignment tab adapted to abut an outer surface of the wheel cladding, thereby aligning the first member with a wheel cladding.

15. The vehicle wheel assembly of claim 14, wherein at least one alignment tab includes a pair of alignment tabs positioned across the first member from one another.

* * * * *